(12) United States Patent
Nishigaki et al.

(10) Patent No.: US 11,511,646 B2
(45) Date of Patent: Nov. 29, 2022

(54) MANAGEMENT APPARATUS, MANAGEMENT METHOD, AND PROGRAM

(71) Applicant: HONDA MOTOR CO., LTD., Tokyo (JP)

(72) Inventors: Makoto Nishigaki, Wako (JP); Shigeru Namiki, Wako (JP); Minoru Uoshima, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 313 days.

(21) Appl. No.: 16/881,023

(22) Filed: May 22, 2020

(65) Prior Publication Data
US 2020/0384889 A1 Dec. 10, 2020

(30) Foreign Application Priority Data

Jun. 3, 2019 (JP) ............................. JP2019-103818

(51) Int. Cl.
*B60L 58/18* (2019.01)
*G06Q 30/06* (2012.01)
(Continued)

(52) U.S. Cl.
CPC .............. *B60L 58/18* (2019.02); *B60L 50/66* (2019.02); *G06N 5/04* (2013.01); *G06N 20/00* (2019.01);
(Continued)

(58) Field of Classification Search
CPC ...... B60L 58/18; B60L 50/66; B60L 2240/54; B60L 2250/12; B60L 2250/20;
(Continued)

(56) References Cited

U.S. PATENT DOCUMENTS 5,315,287 A * 5/1994 Sol ........................ H02J 7/0048
320/DIG. 19
5,408,177 A * 4/1995 Dea ....................... H02J 7/0048
324/156
(Continued)

FOREIGN PATENT DOCUMENTS

CN 1672171 A * 9/2005 ............. B82Y 10/00
CN 203311481 U * 11/2013 ............... G07C 5/00
(Continued)

OTHER PUBLICATIONS

Japanese Office Action for Japanese Patent Application No. 2019-103818 dated Feb. 22, 2022.
(Continued)

*Primary Examiner* — M Baye Diao
(74) *Attorney, Agent, or Firm* — Amin, Turocy & Watson, LLP

(57) ABSTRACT

A management apparatus includes an acquirer configured to acquire vehicle usage state information about a usage state of a vehicle, and a processing unit configured to apply the vehicle usage state information to a model which outputs feature amounts when vehicle usage information is input thereto to acquire the feature amounts, to select a secondary battery recommended to be mounted in the vehicle for which the vehicle usage state information is acquired from secondary batteries providable as the secondary battery to be mounted in the vehicle and storing electric power for travel on the basis of the acquired feature amounts, and to present the selected secondary battery.

6 Claims, 6 Drawing Sheets

(51) Int. Cl.
  *G06Q 30/02* (2012.01)
  *G06N 20/00* (2019.01)
  *B60L 50/60* (2019.01)
  *H02J 7/00* (2006.01)
  *G06N 5/04* (2006.01)

(52) U.S. Cl.
  CPC ..... *G06Q 30/0203* (2013.01); *G06Q 30/0631* (2013.01); *H02J 7/0048* (2020.01); *B60L 2240/54* (2013.01)

(58) Field of Classification Search
  CPC . B60L 3/12; B60L 53/65; B60L 58/16; G06N 5/04; G06N 20/00; G06N 3/08; G06Q 30/0203; G06Q 30/0631; G06Q 30/0201; G06Q 50/06; H02J 7/0048; H02J 7/00034; Y02T 10/70; Y02T 10/7072; Y02T 90/12; Y02T 90/16; Y02T 90/167; Y04S 30/14; G07C 5/008
  USPC .................................................. 340/426.12
  See application file for complete search history.

(56) References Cited

U.S. PATENT DOCUMENTS

| | | | | |
|---|---|---|---|---|
| 10,193,198 | B2 * | 1/2019 | Ishibashi | ................ H02J 7/005 |
| 2019/0086478 | A1 | 3/2019 | Park et al. | |

FOREIGN PATENT DOCUMENTS

| | | | | | |
|---|---|---|---|---|---|
| EP | 3875976 | A1 | * | 9/2021 | ............. B60L 58/12 |
| JP | H03239128 | A | * | 10/1991 | ............. Y02B 20/72 |
| JP | 2003-242329 | | | 8/2003 | |
| JP | 2013-077054 | | | 4/2013 | |
| JP | 2014-041768 | | | 3/2014 | |
| JP | 2014-167450 | | | 9/2014 | |
| JP | 2016-008873 | | | 1/2016 | |
| JP | 2017-134894 | | | 8/2017 | |
| KR | 20040085949 | A | * | 10/2004 | ........... H02J 7/0045 |
| KR | 100801568 | B1 | * | 2/2008 | ........... H02J 7/0048 |

OTHER PUBLICATIONS

Japanese Notice of Allowance for Japanese Patent Application No. 2019-103818 dated Jul. 5, 2022.

* cited by examiner

FIG. 2

| BATTERY IDENTIFICATION INFORMATION | SOC-OCV | INTERNAL RESISTANCE | CAPACITY | PRICE | ... |
|---|---|---|---|---|---|
| B0001 | S0001 | R0001 | C0001 | P0001 | ... |
| B0002 | S0002 | R0002 | C0002 | P0002 | ... |
| B0003 | S0003 | R0003 | C0004 | P0003 | ... |
| ... | ... | ... | ... | ... | ... |

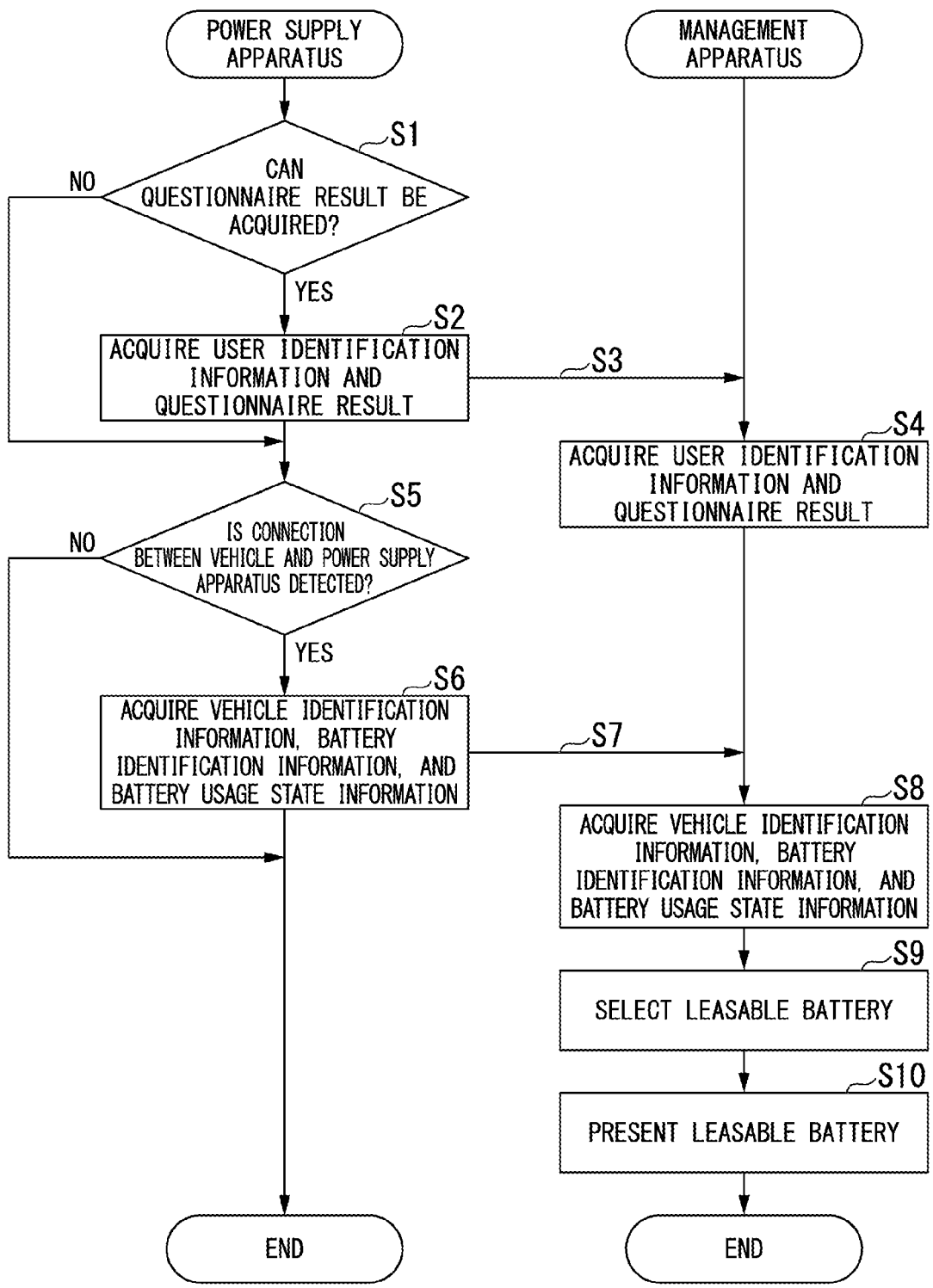

MANAGEMENT APPARATUS, MANAGEMENT METHOD, AND PROGRAM

CROSS-REFERENCE TO RELATED APPLICATION

Priority is claimed on Japanese Patent Application No. 2019-103818, filed Jun. 3, 2019, the content of which is incorporated herein by reference.

BACKGROUND OF THE INVENTION

Field of the Invention

The present invention relates to a management apparatus, a management method, and a program.

Description of Related Art

There are various user requirements for vehicles. Accordingly, a system for selecting a combination of components of a vehicle to satisfy vehicle user requirements has been proposed (refer to Japanese Unexamined Patent Application, First Publication No. 2003-242329).

In addition, a system for managing a battery deterioration state such that a battery is prevented from becoming unavailable in a lease period of an electric vehicle in which a motor is driven by electric power stored in the battery mounted therein has been proposed. Furthermore, in this system, a pattern in which a battery deterioration state is detected and the battery or the vehicle is exchanged on the basis of a detected degree of deterioration of the battery has been proposed (refer to Japanese Unexamined Patent Application, First Publication No. 2013-77054).

SUMMARY OF THE INVENTION

However, in the conventional technology, a purchased vehicle may need to be replaced with a new one when user requirements change after purchase. Furthermore, there are cases in which when the purpose of the conventional technology is to extend the battery life and a vehicle is exchanged for the purpose of extending the battery life, the conventional technology may not be suitable for user requirements.

An object of aspects according to the present invention devised in view of such circumstances is to provide a management apparatus, a management method, and a program which can provide a secondary battery suitable for user requirements.

To solve the aforementioned problems to accomplish such an object, the present invention employs the following aspects.

(1): A management apparatus according to an aspect of the present invention includes: an acquirer configured to acquire vehicle usage state information about a usage state of a vehicle; and a processing unit configured to apply the vehicle usage state information to a model which outputs feature amounts when vehicle usage information is input thereto to acquire the feature amounts, to select a secondary battery recommended to be mounted in the vehicle for which the vehicle usage state information is acquired from secondary batteries providable as the secondary battery to be mounted in the vehicle and storing electric power for travel on the basis of the acquired feature amounts, and to present the selected secondary battery.

(2): In the aspect of (1), the vehicle usage state information may include user-originating information which is acquired from a user and represents a usage state of the vehicle assumed or experienced by the user.

(3): In the aspect of (1) or (2), the vehicle usage state information may include battery usage state information about a usage state of the secondary battery.

(4): In the aspect of any of (1) to (3), the processing unit may select the secondary battery from the providable secondary batteries and present the selected secondary battery at at least one occasion of a time of purchase of the vehicle, every predetermined interval after purchase of the vehicle, and a time of change of the vehicle usage state information.

(5): In the aspect of (2), the user-originating information may be a result of a questionnaire conducted for the user.

(6): A management method performed by a management apparatus according to an aspect of the present invention includes: acquiring vehicle usage state information about a usage state of a vehicle; applying the vehicle usage state information to a model which outputs feature amounts when vehicle usage information is input thereto to acquire the feature amounts; and selecting a secondary battery recommended to be mounted in the vehicle for which the vehicle usage state information is acquired from secondary batteries providable as the secondary battery to be mounted in the vehicle and storing electric power for travel on the basis of the acquired feature amounts and presenting the selected secondary battery.

(7): A computer-readable non-transitory storage medium according to an aspect of the present invention stores a program causing a computer of a management apparatus to: acquire vehicle usage state information about a usage state of a vehicle; apply the vehicle usage state information to a model which outputs feature amounts when vehicle usage information is input thereto to acquire the feature amounts; and select a secondary battery recommended to be mounted in the vehicle for which the vehicle usage state information is acquired from secondary batteries providable as the secondary battery to be mounted in the vehicle and storing electric power for travel on the basis of the acquired feature amounts and present the selected secondary battery.

According to the aspects of (1) to (7), it is possible to provide a secondary battery suitable for user requirements because a battery is selected on the basis of acquired information about a usage state of a vehicle.

According to the aspect of (2), it is possible to provide a secondary battery according to a user's schedule to use a vehicle or environmental change because a battery is selected on the basis of acquired information on a state in which the user uses the vehicle.

According to the aspect of (3), it is possible to provide a secondary battery according to change in a way of using a battery because a battery is selected on the basis of acquired information about a secondary battery usage state.

According to the aspect of (4), it is possible to provide a secondary battery suitable for user requirements when user requirements have changed because information is acquired at the time of purchase or at predetermined intervals.

According to the aspect of (5), it is possible to provide a secondary battery at a request of a user through a questionnaire.

BRIEF DESCRIPTION OF THE DRAWINGS

FIG. 2 is a diagram showing information on batteries that can be leased, stored in a storage according to the embodiment.

FIG. 7 is a flowchart of processing performed by the secondary battery operating system according to the embodiment.

DETAILED DESCRIPTION OF THE INVENTION

Hereinafter, embodiments of a management apparatus, a management method, and a program of the present invention will be described with reference to the drawings. In the following description, a vehicle is assumed to be an electric vehicle having a secondary battery mounted therein or an electric vehicle in which a secondary battery can be exchanged. However, the vehicle may be a vehicle which can store electric power from the outside and may have a secondary battery mounted therein and supplying electric power for travel and may be a hybrid vehicle or a fuel battery vehicle. Further, the vehicle may be a four-wheeled vehicle, a three-wheeled vehicle, a saddle riding type vehicle, an electric power assisted bicycle, a cultivator, a management machine, a walking assisting apparatus, a kickboard, or the like in which a secondary battery can be mounted or exchanged.

Overall Configuration

Figure 1:
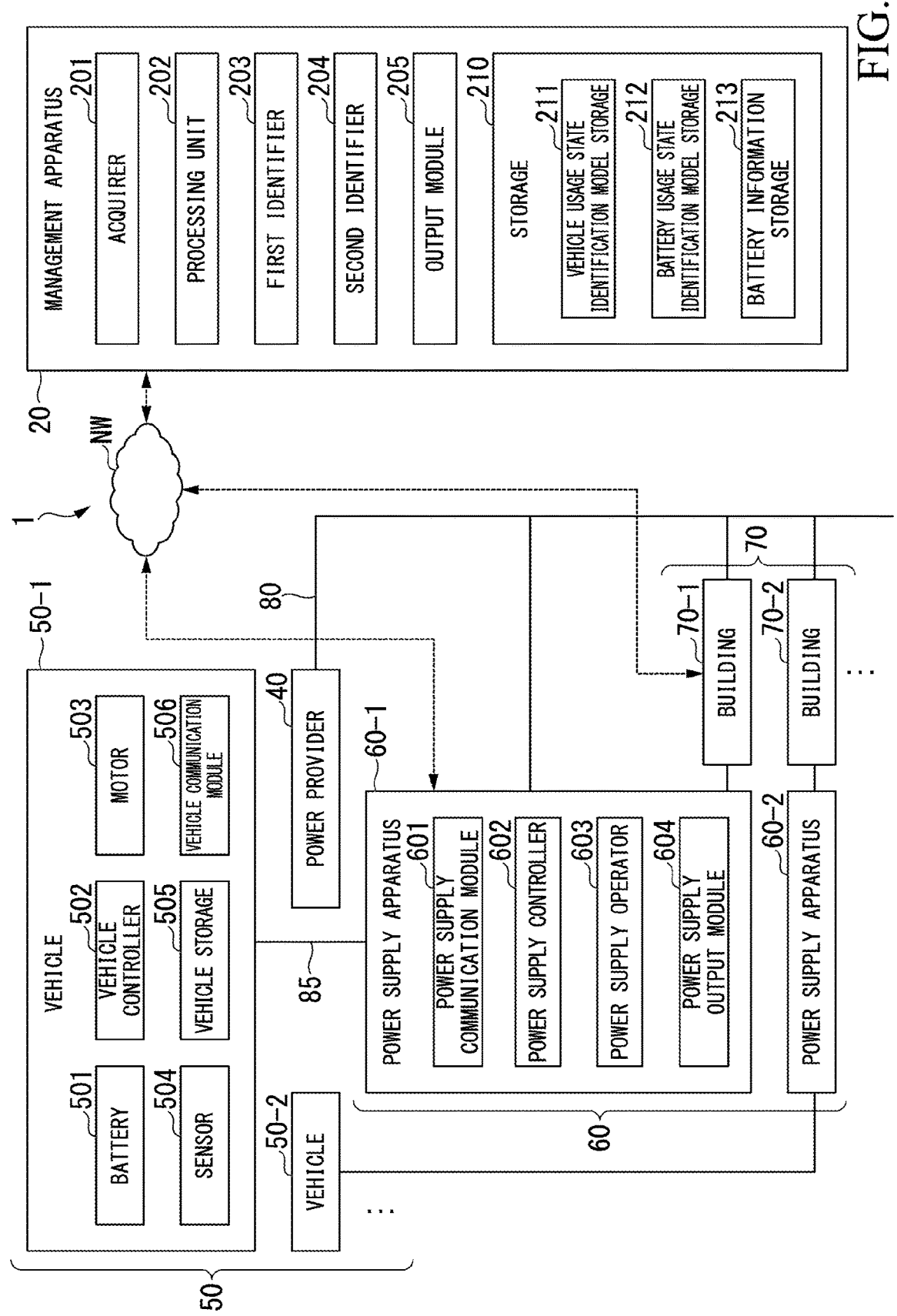
FIG. 1 is a diagram showing an example of a configuration and a usage environment of a secondary battery operating system including a management apparatus according to an embodiment.

FIG. 1 is a diagram showing an example of a configuration and a usage environment of a secondary battery operating system 1 including a management apparatus 20 according to the present embodiment. As shown in FIG. 1, the secondary battery operating system 1 includes the management apparatus 20, a power provider 40, at least one vehicle 50 (50-1, 50-2, . . . ), at least one power supply apparatus 60 (60-1, 60-2, . . . ). Meanwhile, when one of the vehicles 50-1, 50-2, . . . is not specified, they are referred to as a vehicle 50 in the following description. In addition, when one of the power supply apparatuses 60-1, 60-2, . . . is not specified, they are referred to as a power supply apparatus 60. Furthermore, the secondary battery operating system 1 may include at least one building 70 (70-1, 70-2, . . . ). In addition, when one of the buildings 70-1, 70-2, . . . is not specified, they are referred to as a building 70.

A usage environment example and a usage example of the secondary battery operating system 1 will be described with reference to FIG. 1. First, a user replies to, for example, a questionnaire in a dealer shop of the vehicle 50 when he/she purchases the vehicle 50. The questionnaire includes, for example, survey details such as the age, the sex, the address, and an assumed traveling time per week of the user, and information on whether the user is married or single. A questionnaire result is user-originating information with respect to a vehicle usage state (vehicle usage state information) and represents an expected usage state or a usage state of the vehicle 50 of the user. A dealer of the dealer shop inputs the questionnaire result to the power supply apparatus 60 installed in the dealer shop. The management apparatus 20 selects a battery 501 (secondary battery) to be used for the suggested vehicle 50 on the basis of the questionnaire result and transmits a selection result to the power supply apparatus 60. Accordingly, the management apparatus 20 suggests the battery 501 suitable for user requirements when the user purchases the vehicle 50. In this case, the battery 501 is a charged rental. In addition, a usage fee of the battery 501 is monthly paid, for example. Then, the dealer selects and suggests the vehicle 50 on the basis of the questionnaire result and suggests the battery 501 presented to the power supply apparatus 60.

After purchase of the vehicle 50, the user visits the dealer shop every two years, for example. Then, the power supply apparatus 60 installed in the dealer shop acquires a battery usage state information (vehicle usage state information) representing a usage state of the battery 501 mounted in the vehicle 50 used by the user and transmits the acquired battery usage state information to the management apparatus 20. Alternatively, a questionnaire may be performed again after two years after purchase of the vehicle 50. In this case, the power supply apparatus 60 may also transmit a questionnaire result to the management apparatus 20. The management apparatus 20 re-suggests a battery 501 suitable for user requirements on the basis of the battery usage state information received from the power supply apparatus 60 at that point in time. Alternatively, the management apparatus 20 re-suggests a battery 501 suitable for user requirements on the basis of the battery usage state information and the questionnaire result received from the power supply apparatus 60 at that point in time. Furthermore, user identification information for identifying the user is assigned to the user, for example, when the vehicle 50 is purchased. In addition, vehicle identification information for identifying a vehicle is assigned to the vehicle 50. Further, battery identification information for identifying the battery 501 is assigned to the battery 501.

Further, the power supply apparatus 60 is installed, for example, at the dealer shop of the vehicle 50, the building 70 used by the user of the vehicle 50 (e.g., a house, a company that the user works for, accommodations used by the user, charging stations, and the like). The user connects the vehicle 50 to the power supply apparatus 60 when he/she returns home.

In addition, the power supply apparatus 60 and the power provider 40 are connected to each other through a power transmission line 80. The management apparatus 20 and the power supply apparatus 60 are connected to each other through a network NW. Further, the vehicle 50 and the power supply apparatus 60 are connected to each other through a cable 85. Meanwhile, the cable 85 is a feed cable and may include a signal line. Further, the cable 85 includes at least a connection plug with respect to the vehicle 50. Alternatively, the cable 85 may include a feed cable on which signals are superposed. Meanwhile, the network NW includes, for example, the Internet, a wide area network (WAN), a local area network (LAN), a provider device, a wireless base station, and the like.

The user selects whether to operate a vehicle-to-grid (V2G) system or a vehicle-to-home (V2H) system, for example, by operating the vehicle 50 or the power supply apparatus 60.

The V2G system is a system which performs electric power interchange between a power system including a commercial power network and a vehicle. In the V2G system, the battery 501 mounted in the vehicle 50 is used as a power storage facility when the vehicle 50 is not used as a transportation means. Accordingly, bidirectional electric power transfer between a vehicle and a power system participating in V2G is performed. In this case, the management apparatus 20 performs control such that electric power supply to the vehicle 50 through the power supply apparatus 60 is performed and performs control such that electric power interchange between the power system including the commercial power network and the vehicle 50 is performed.

The V2H system is a system which performs electric power interchange between a house or the like and a vehicle. In the V2H system, electric power stored in the battery 501 mounted in the vehicle 50 is supplied to a house and used home. In this case, the management apparatus 20 performs control such that electric power is supplied the vehicle 50 through the power supply apparatus 60 and performs control such that electric power interchange between the building 70 and the vehicle 50 is performed.

Power Provider 40

The power provider 40 includes a power plant that generates power using energy such as firepower, wind power, nuclear power, or sunlight and supplies electric power to an allocated area, for example. Here, a method of defining an area is not limited and an area may be defined, for example, using an administrative district such as a prefecture, a city, a town or a village as a unit or using a jurisdiction of a substation as a unit. The power provider 40 transmits an instruction with respect to charging/discharging of the battery 501 mounted in the vehicle 50 to the management apparatus 20 through the network NW in response to power demand Meanwhile, the example shown in FIG. 1 is an example in which there is a single area and an example of a single power supply 40.

Management Apparatus 20

The management apparatus 20 includes an acquirer 201, a processing unit 202, a first identifier 203, a second identifier 204, an output module 205, and a storage 210. In addition, the storage 210 includes a vehicle usage state identification model storage 211, a battery usage state identification model storage 212, and a battery information storage 213. Meanwhile, the storage 210 may be connected to the management apparatus 20 through the network NW.

The management apparatus 20 communicates with at least one power supply apparatus 60 through the network NW. The management apparatus 20 selects a battery 501 suitable for user requirements when the user purchases the vehicle 50 on the basis of leasable battery information about leasable batteries 501 stored in the storage 210 and a questionnaire result. That is, the management apparatus 20 selects a battery 501 recommended to be mounted in the vehicle 50 and suggests the selected battery 501 recommended to be mounted in the vehicle 50 through the power supply apparatus 60. The management apparatus 20 selects the battery 501 suitable for the user requirements at the point in time on the basis of the leasable battery information about the leasable batteries 501 stored in the storage 210 and leased battery information about a leased battery 501 acquired from the vehicle 50. Meanwhile, the leasable battery information stored in the storage 210 and the leased battery information acquired from the vehicle 50 will be described later. The management apparatus 20 transmits information about the selected battery 501 to the power supply apparatus 60 through the network NW. In addition, the management apparatus 20 communicates with the power provider 40 through the network NW. The management apparatus 20 manages electric power on the basis of information transmitted from the power provider 40. The management apparatus 20 performs charging of the battery 501 or electric power supply from the vehicle 50 to the power system by managing charging/discharging of the battery 501 of the vehicle 50 connected to the power supply apparatus 60.

The acquirer 201 acquires user identification information and a questionnaire result from the power supply apparatus 60 through the network NW and outputs the acquired user identification information and questionnaire result to the processing unit 202. The acquirer 201 acquires vehicle identification information, battery identification information, and battery usage state information from the power supply apparatus 60 through the network NW and outputs the acquired vehicle identification information, battery identification information, and battery usage state information to the processing unit 202. The acquirer 201 receives a request from the power provider 40 through the network NW. The request received from the power provider 40 is, for example, an electric power supply request for the power system, an electric power supply stop request for the power system, or the like. The acquirer 201 outputs the request acquired from the power provider 40 to the processing unit 202.

The processing unit 202 acquires the user identification information and the questionnaire result output from the acquirer 201 and causes the storage 210 to store the acquired user identification information and questionnaire result. The processing unit 202 selects a battery 501 suitable for user requirements when the user purchases the vehicle 50 on the basis of vehicle usage state feature amounts output from the first identifier 203 and the leasable battery information stored in the storage 210. The processing unit 202 assigns the user identification information to the selection result and outputs the selection result having the user identification information assigned thereto to the output module 205. Meanwhile, the processing unit 202 stores the user identification information in association with the vehicle identification information and the battery identification information, for example, when the battery 501 is leased. In addition, the processing unit 202 acquires the vehicle identification information, the battery identification information, and the battery usage state information output from the acquirer 201 and causes the storage 210 to store the acquired vehicle identification information, battery identification information, and battery usage state information. The processing unit 202 re-selects a battery 501 suitable for user requirements after the vehicle 50 is purchased on the basis of vehicle usage state feature amounts output from the first identifier 203, at least one of battery usage state feature amounts output from the second identifier 204, and the leasable battery information stored in the storage 210. The processing unit 202 assigns the vehicle identification information to the selection result and outputs the selection result having the vehicle identification information assigned thereto to the output module 205. In addition, the processing unit 202 generates a control instruction for the vehicle 50 that operates V2G such that electric power supply to the power system is performed in response to a request acquired from the power provider 40 and output from the acquirer 201. The processing unit 202 adds the vehicle identification information to the generated control instruction and outputs the control instruction having the vehicle identification information added thereto to the output module 205.

The first identifier 203 inputs the questionnaire result stored in the storage 210 to a vehicle usage state identification model stored in the vehicle usage state identification model storage 211 and outputs vehicle usage state feature amounts. Meanwhile, the vehicle usage state feature amounts will be described later. The first identifier 203 outputs the obtained vehicle usage state feature amounts to the processing unit 202.

The second identifier 204 inputs the battery usage state information stored in the storage 210 to a battery usage state identification model stored in the battery usage state identification model storage 212 and outputs battery usage state feature amounts. Meanwhile, the battery usage state feature amounts will be described later. The second identifier 204 outputs the obtained battery usage state feature amounts to the processing unit 202.

The output module 205 transmits the selection result having the user identification information assigned thereto output from the processing unit 202 to the power supply apparatus 60 through the network NW. Alternatively, the output module 205 transmits the selection result having the vehicle identification information assigned thereto output from the processing unit 202 to the power supply apparatus 60 through the network NW. Alternatively, the output module 205 transmits the control instruction having the vehicle identification information assigned thereto output from the processing unit 202 to the power supply apparatus 60 connected to the vehicle 50 having the vehicle identification information through the network NW.

The storage 210 stores the user identification information in association with the questionnaire result. The storage 210 stores the battery identification information in association with the battery usage state information.

The vehicle usage state identification model storage 211 stores the vehicle usage state identification model used when vehicle usage state feature amounts are obtained. Meanwhile, the vehicle usage state identification model may be stored in the first identifier 203. Further, the vehicle usage state identification model is created through machine learning, for example, using a model such as a neural network and teacher data.

The battery usage state identification model storage 212 stores the battery usage state identification model used when battery usage state feature amounts are obtained. Meanwhile, the battery usage state identification model may be stored in the second identifier 204. Further, the battery usage state identification model is created through machine learning, for example, using a model such as a neural network and teacher data.

The battery information storage 213 stores the leasable battery information. The leasable battery information is information about leasable batteries 501 and includes, for example, information such as a state of charge-open circuit voltage (SOC-OCV) characteristic, internal resistance, capacity, hours of use, prices, a new product, and a used product. Meanwhile, SOC is a charging rate. In addition, OCV is an open circuit voltage.

Power Supply Apparatus 60

The power supply apparatus 60 includes a power supply communication module 601, a power supply controller 602, a power supply operator 603, and a power supply output module 604.

The power supply apparatus 60 communicates with the management apparatus 20 through the network NW. A power transmission line 80 is connected to the power supply apparatus 60. The vehicle 50 is connected to the power supply apparatus 60 through the cable 85. The power supply apparatus 60 transmits an input questionnaire result to the management apparatus 20 through the network NW by operating the power supply operator 603. Meanwhile, the questionnaire result includes the name of the user, and the like. The power supply apparatus 60 acquires the vehicle identification information, battery identification information, and battery usage state information output from the vehicle 50 through the cable 85. The power supply apparatus 60 transmits the acquired vehicle identification information, battery identification information, and battery usage state information to the management apparatus 20 through the network NW. The power supply apparatus 60 receives the user identification information and a selection result from the management apparatus 20 through the network NW and presents the received selection result. In addition, when the user selects execution of V2G operation, the power supply apparatus 60 performs control of charging of electric power from the power system to the battery 501 mounted in the vehicle 50 and control of supply of electric power stored in the battery 501 to the power system on the basis of a control instruction received from the management apparatus 20. In addition, when the user selects execution of V2H operation, the power supply apparatus 60 performs control such that electric power stored in the battery 501 mounted in the vehicle 50 is supplied to the building 70.

The power supply communication module 601 receives a control instruction transmitted from the management apparatus 20 through the network NW and outputs the received control instruction to the power supply controller 602. The power supply communication module 601 acquires the vehicle identification information, battery identification information, and battery usage state information output from the vehicle 50 and outputs the acquired vehicle identification information, battery identification information, and battery usage state information to the power supply controller 602. The power supply communication module 601 transmits a questionnaire result output from the power supply controller 602 to the management apparatus 20 through the network NW. The power supply communication module 601 transmits the vehicle identification information, battery identification information, and battery usage state information output from the power supply controller 602 to the management apparatus 20 through the network NW.

The power supply controller 602 acquires an operation result output from the power supply operator 603 and outputs the acquired operation result to the power supply communication module 601 such that the acquired operation result is transmitted to the management apparatus 20. Meanwhile, the operation result includes a questionnaire result. Further, the operation result may include information representing whether participation in a V2G operation or a V2H operation is performed. The power supply controller 602 acquires the vehicle identification information, battery identification information, and battery usage state information output from the power supply communication module 601 and outputs the acquired vehicle identification information, battery identification information, and battery usage state information to the power supply communication module 601 having the management apparatus 20 as a transmission destination. The power supply controller 602 acquires a selection result output from the power supply communication module 601. The power supply controller 602 generates an image of the acquired selection result and outputs the generated image to the power supply output module 604. In addition, the power supply controller 602 acquires a control instruction output from the power supply communication module 601. The power supply controller 602 performs control of charging of electric power from the power system to the battery 501 mounted in the vehicle 50 and control of supply of electric power stored in the battery 501 to the power system on the basis of the acquired control instruction. Further, the power supply controller 602 detects connection of the vehicle 50 through the cable 85, for example, on the basis of change in the voltage of the cable 85.

The power supply operator 603 is, for example, a touch panel sensor. The power supply operator 603 detects a result of an operation performed by the user of the power supply apparatus 60 and outputs the detected operation result to the power supply controller 602.

The power supply output module 604 is, for example, an image display device. The power supply output module 604 displays an image output from the power supply controller 602. The displayed image is information about the battery 501 suitable for user requirements (a monthly payment, the capacity of the battery 501, and the like). Meanwhile, the power supply output module 604 may be a printing device.

Vehicle 50

The vehicle 50 includes the battery 501, a vehicle controller 502, a motor 503, a sensor 504, a vehicle storage 505, and a vehicle communication module 506. Further, the vehicle 50 includes an inverter, a transmission, a vehicle wheels, and the like which are not shown.

The battery 501 is, for example, a secondary battery such as a lithium ion battery. The battery 501 stores electric power and discharges the stored electric power according to control of the vehicle controller 502.

The vehicle controller 502 acquires detection values (current values, voltage values, and the like) output from the sensor 504, for example, at predetermined intervals. The vehicle controller 502 calculates SOC-OCV characteristics of the battery 501, the internal resistance of the battery 501, and the capacity of the battery 501 at predetermined intervals using acquired current values, voltage values and temperatures. The vehicle controller 502 causes the vehicle storage 505 to store the calculated SOC-OCV characteristic, internal resistance, and capacity as battery usage state information. When the vehicle controller 502 is connected to the power supply apparatus 60 through the cable 85, the vehicle controller 502 reads vehicle identification information and battery identification information stored in the vehicle storage 505. The vehicle controller 502 outputs the vehicle identification information, the battery identification information, and the battery usage state information to the vehicle communication module 506. The vehicle controller 502 performs control such that electric power is charged to the battery 501 according to control of the power supply apparatus 60. Alternatively, the vehicle controller 502 performs control such that electric power stored in the battery 501 is output to the power supply apparatus 60 according to control of the power supply apparatus 60.

The motor 503 rotates the vehicle wheels using electric power supplied from the battery 501 according to control of the vehicle controller 502.

The sensor 504 includes, for example, a current sensor which detects current flowing through the battery 501 and a voltage sensor which detects a voltage of the battery 501. The sensor 504 outputs detected values to the vehicle controller 502.

The vehicle storage 505 stores vehicle identification information and battery identification information. In addition, the vehicle storage 505 stores battery usage state information. Further, when the battery 501 includes a storage, the battery 501 may store the battery identification information.

The vehicle communication module 506 outputs vehicle identification information, battery identification information and battery usage state information output from the vehicle controller 502 to the power supply apparatus 60 through the cable 85 when the vehicle 50 is connected to the power supply apparatus 60 through the cable 85.

Building 70

The building 70 is, for example, a dealer shop of the vehicle 50, a house of the user, a company that the user works for, accommodation used by the user, charging stations, or the like. The building 70 includes, for example, home appliances, lighting apparatuses, and the like. Further, the building 70 receives supply of electric power from the power system or receives electric power from the vehicle 50 through the power supply apparatus 60. Such switching is performed by the power supply apparatus 60, for example.

Meanwhile, the components of the processing unit 202, the first identifier 203, and the second identifier 204 the management apparatus 20 are realized, for example, by a hardware processor such as a central processing unit (CPU) executing a program (software). Otherwise, the power supply controller 602 of the power supply apparatus 60 is realized, for example, by a hardware processor such as a CPU executing a program (software). Otherwise, the vehicle controller 502 of the vehicle 50 is realized, for example, by a hardware processor such as an electronic control unit (ECU) or a CPU executing a program (software). Some or all of the processing unit 202, the power supply controller 602, and the vehicle controller 502 may be realized by hardware (a circuit including a circuitry) such as a large scale integration (LSI) circuit, an application specific integrated circuit (ASIC), a field-programmable gate array (FPGA), or a graphics processing unit (GPU) or realized by software and hardware in cooperation. The program may be stored in advance in a storage device (storage device including a non-transitory storage medium) such as a hard disk drive (HDD) or a flash memory or stored in a separable storage medium (non-transitory storage medium) such as a DVD or a CD-ROM and installed when the storage medium is inserted into a drive device.

Furthermore, the above-described management apparatus 20 may be included in the power supply apparatus 60.

Leasable Battery Information

Next, an example of leasable battery information stored in the storage 210 will be described. FIG. 2 is a diagram showing leasable battery information stored in the storage 210 according to the present embodiment. As shown in FIG. 2, the storage 210 stores information about a battery for each piece of battery identification information. Information about the battery 501 includes, for example, information such as SOC-OCV characteristic, an internal resistance, a capacity, a price (monthly charge), a new product, and a used product. Meanwhile, the leasable battery information shown in FIG. 2 is an example and the present invention is not limited thereto. The leasable battery information may include, for example, information such as a weight, and in the case of a used product, an appearance condition and a time for which it has been used.

Vehicle Usage State Identification Model

Figure 3:
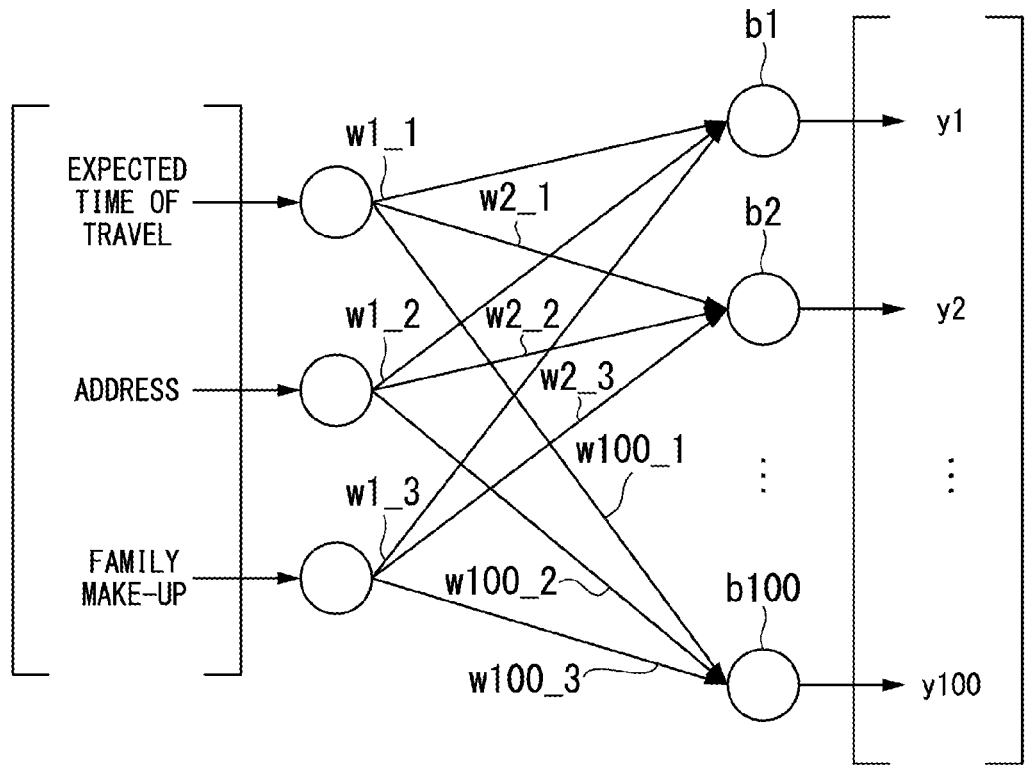
FIG. 3 is a diagram showing an example of a vehicle usage state identification model according to the embodiment.

Next, an example of a vehicle usage state identification model will be described. FIG. 3 is a diagram showing an example of a vehicle usage state identification model according to the present embodiment. Inputs to the vehicle usage state identification model of the example shown in FIG. 3 are questionnaire results, and the vehicle usage state identification model is, for example, a model which has expected traveling times in a week, an address, and family make-up as inputs and obtains vehicle usage state feature amounts (y1, y2, . . . , y100). Meanwhile, the number of middle layers, weighting factors, and the number of vehicle usage state feature amounts shown in FIG. 3 are examples and the present invention is not limited thereto. In addition, the number of inputs to the model is not limited thereto and may be two or more among the expected time of travel, the address and the family make-up. Furthermore, a V2G operation schedule, a V2H operation schedule, and the like may be input to the model.

Battery Usage State Identification Model

Figure 4:
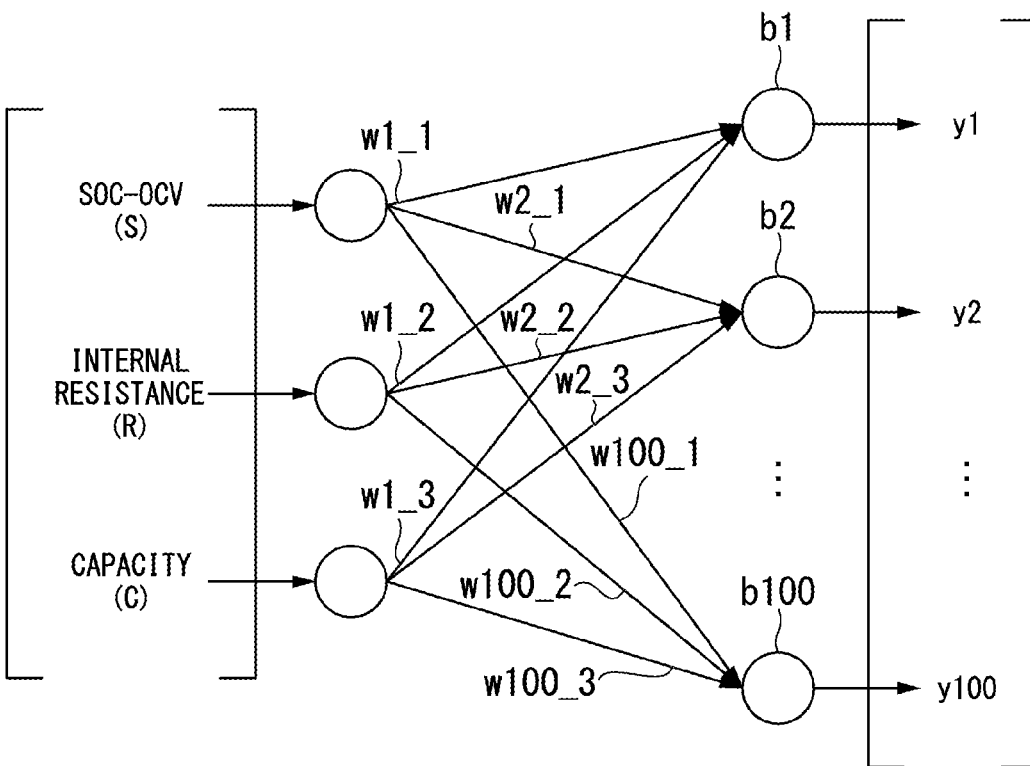
FIG. 4 is a diagram showing an example of a battery usage state identification model according to the embodiment.

Next, an example of a battery usage state identification model will be described. FIG. 4 is a diagram showing an example of a battery usage state identification model according to the present embodiment. Inputs to the battery usage state identification model of the example shown in FIG. 4 are battery usage state information and the battery usage state identification model is, for example, a model which has SOC-OCV characteristics, an internal resistance, and a capacity as inputs and obtains battery usage state feature amounts (y1, y2, . . . , y100). Meanwhile, the number of middle layers, weighting factors, and the number of battery usage state feature amounts shown in FIG. 4 are examples and the present invention is not limited thereto. In addition, the number of inputs to the model is not limited thereto and may be two or more among the SOC-OCV characteristics, the internal resistance, and the capacity. Furthermore, a conduction time of the battery 501, a surrounding temperature of the battery 501, and the like may be input to the model.

Selection of Battery 501 Suitable for User Requirements

Figure 5:
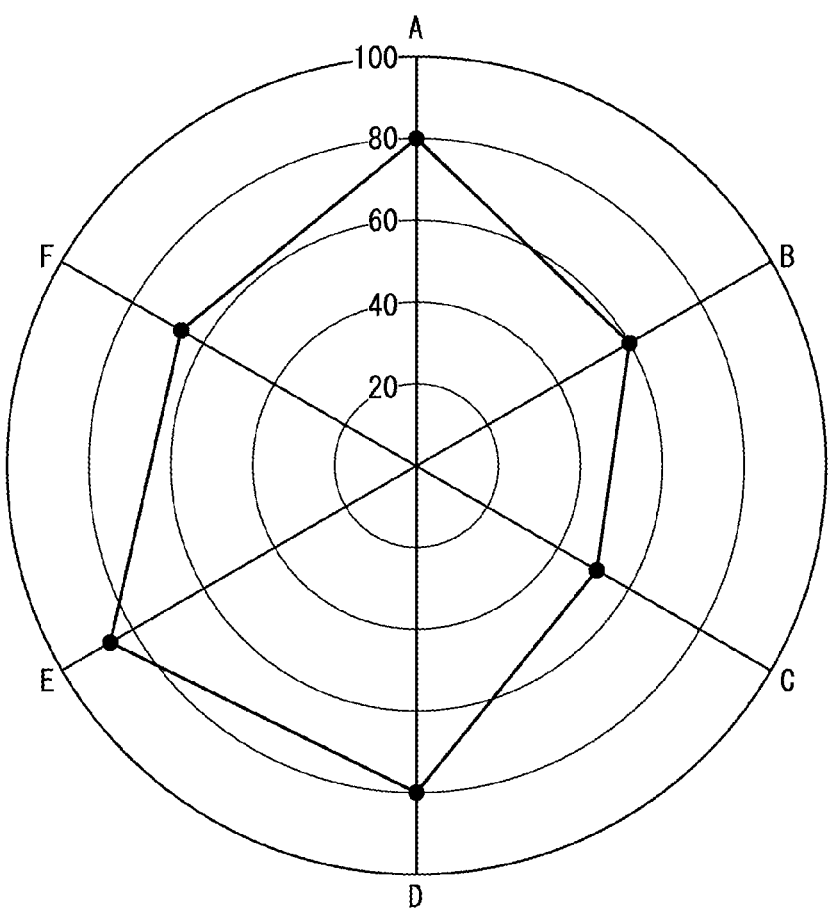
FIG. 5 is a diagram showing an example of a radar chart used when a battery suitable for user requirements is selected according to the embodiment.

Next, an example of a method of selecting a battery 501 suitable for user requirements will be described. FIG. 5 is a diagram showing an example of a radar chart used when a battery 501 suitable for user requirements is selected according to the present embodiment. In FIG. 5, A to F in the radar chart are vehicle usage state feature amounts obtained using the vehicle usage state identification model. The processing unit 202 of the management apparatus 20 represents the vehicle usage state feature amounts obtained using the vehicle usage state identification model on the radar chart and selects a battery 501 suitable for the user requirements from leasable batteries 501 stored in the battery information storage 213 on the basis of the shape of the radar chart. In this manner, the processing unit 202 selects a battery 501 suitable for the user requirements on the basis of an expected usage state or a usage state of the vehicle 50 in the present embodiment. Meanwhile, the processing unit 202 may represent the vehicle usage state feature amounts on a scatter diagram, a bubble chart, and the like as well as a radar chart and select a battery 501 suitable for the user requirements on the basis of the shape thereof. Alternatively, the processing unit 202 may input the vehicle usage state feature amounts to a model for selecting a battery 501 suitable for the user requirements and select a battery 501 suitable for the user requirements.

Figure 6:
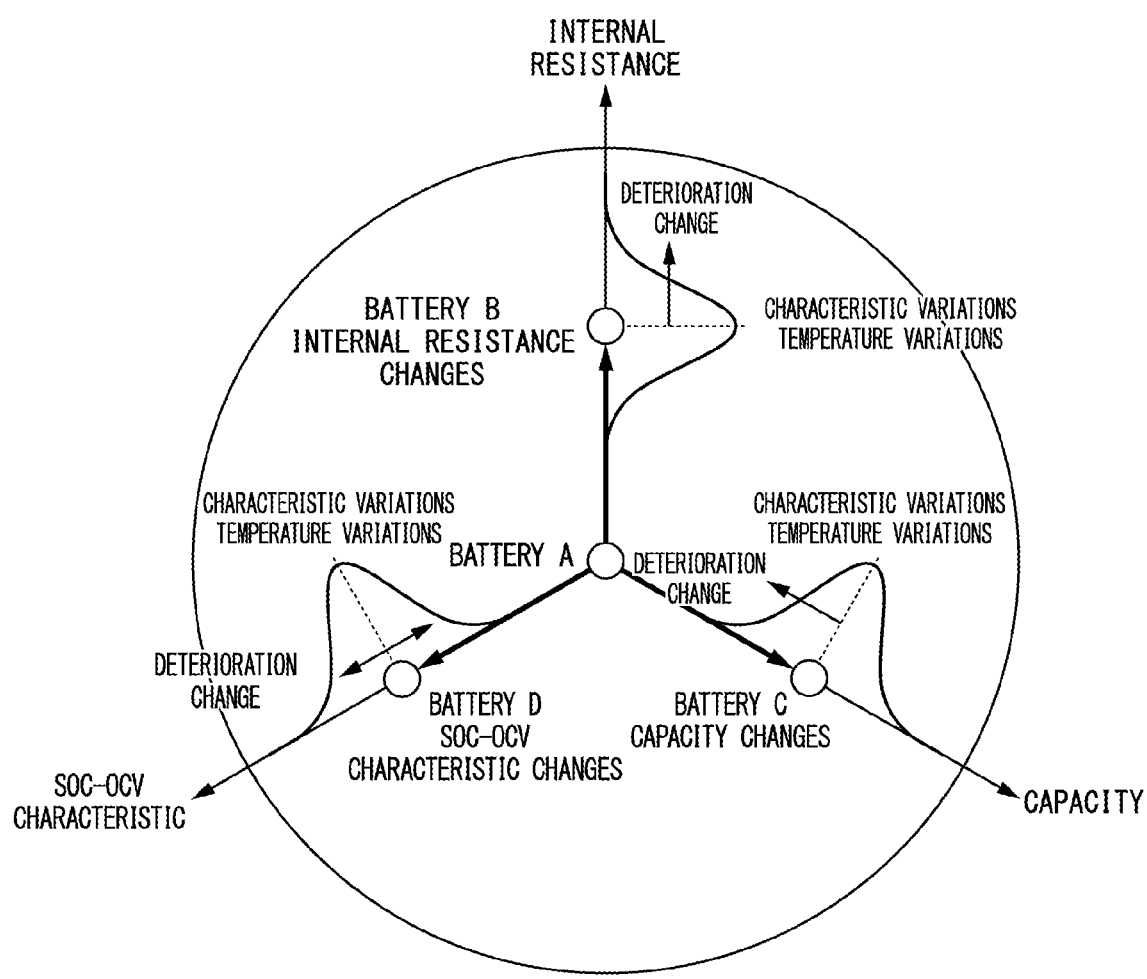
FIG. 6 is a diagram showing an example of changes in characteristics of a leased battery according to the embodiment.

FIG. 6 is a diagram showing an example of changes in characteristics of leased batteries 501 according to the present embodiment. As shown in FIG. 6, SOC-OCV characteristics, internal resistances and capacities of the batteries 501 change according to charging/discharging and conduction times of the batteries 501. In addition, such changes are also affected by variations in the characteristics of the batteries 501 and variations in the temperatures of environments in which the batteries 501 are used. In FIG. 6, battery A is in a state in which the SOC-OCV characteristics, the internal resistance and the capacity thereof do not change. Battery B has deteriorated due to a changed internal resistance thereof. Battery C has deteriorated due to a changed capacity thereof. Battery D has deteriorated due to changed SOC-OCV characteristics thereof.

Example of Processing Procedure of Battery Operating System

Next, an example of a processing procedure performed by the secondary battery operating system 1 will be described. FIG. 7 is a flowchart of processing performed by the secondary battery operating system 1 according to the present embodiment.

The power supply controller 602 of the power supply apparatus 60 determines whether a questionnaire result can be acquired (step S1).

Next, when a questionnaire result can be acquired, the power supply controller 602 acquires user identification information and the questionnaire result through the cable 85 and the power supply communication module 601 (step S2).

Subsequently, the power supply controller 602 transmits the user identification information and the questionnaire result to the management apparatus 20 through the network NW (step S3).

Then, the processing unit 202 of the management apparatus 20 acquires the user identification information and the questionnaire result transmitted from the power supply apparatus 60 through the network NW and the acquirer 201 (step S4).

Next, when the questionnaire result can be acquired or cannot be acquired, the power supply controller 602 of the power supply apparatus 60 detects whether the vehicle 50 is connected to the power supply apparatus 60 through the cable (step S5).

Subsequently, when connection of the vehicle 50 to the power supply apparatus 60 is detected, the power supply controller 602 acquires vehicle identification information, battery identification information, and battery usage state information from the vehicle 50 through the cable (step S6).

Then, the power supply controller 602 transmits the vehicle identification information, the battery information, and the battery usage state information to the management apparatus 20 through the network NW (step S7).

Subsequently, the processing unit 202 of the management apparatus 20 acquires the vehicle identification information, the battery information, and the battery usage state information transmitted from the power supply apparatus 60 through the network NW and the acquirer 201 (step S8).

When the questionnaire result can be acquired and connection of the vehicle 50 to the power supply apparatus 60 is not detected, the processing unit 202 obtains vehicle usage state feature amounts by inputting the acquired questionnaire result to a vehicle usage state model. Subsequently, the processing unit 202 represents the vehicle usage state feature amounts, for example, on a radar chart and selects a battery 501 most suitable for user requirements when the vehicle 50 is purchased from leasable batteries on the basis of the shape of the radar chart. Then, the processing unit 202 assigns the user identification information to a selection result and transmits the selection result having the user identification information assigned thereto to the power supply apparatus 60 through the acquirer 201 and the network NW. When the questionnaire result can be acquired and connection of the vehicle 50 to the power supply apparatus 60 is detected, the processing unit 202 obtains vehicle usage state feature amounts by inputting the acquired questionnaire result to the vehicle usage state model. Then, the processing unit 202 obtains battery usage state feature amounts by inputting the acquired battery usage state information to a battery usage state identification model. Subsequently, the processing unit 202 selects a battery 501 most suitable for user requirements at that point in time from the leasable batteries, for example, on the basis of a shape of a radar chart, using the vehicle usage state feature amounts obtained using the vehicle usage state model and the battery usage state feature amounts obtained using the battery usage state identification model. Then, the processing unit 202 assigns the vehicle identification information to a selection result and transmits the selection result having the vehicle identification information assigned thereto to the power supply apparatus 60 through the acquirer 201 and the network NW. When the questionnaire result cannot be acquired and connection of the vehicle 50 to the power supply apparatus 60 is detected, the processing unit 202 obtains battery usage state feature amounts by inputting the acquired battery usage state information to the battery usage state identification model. Subsequently, the processing unit 202 selects a battery 501 most suitable for user requirements at that point in time from the leasable batteries, for example, on the basis of a shape of a radar chart, using the battery usage state feature amounts obtained using the battery usage state identification model. Then, the processing unit 202 assigns the vehicle identification information to a selection result and transmits the selection result having the vehicle identification information assigned thereto to the power supply apparatus 60 through the acquirer 201 and the network NW (step S9).

The power supply controller 602 of the power supply apparatus 60 acquires the selection result transmitted from the management apparatus 20 through the network NW and the power supply communication module 601. Subsequently, the processing unit 202 generates an image of the acquired selection result and presents the battery 501 most suitable for the user requirements by outputting the generated image to the power supply output module 604 (step S10).

As described above, the user visits the dealer shop and replies a questionnaire when he/she purchases the vehicle 50 in the present embodiment. Then, the management apparatus 20 selects a battery 501 most suitable for user requirements at the time of purchase of the vehicle 50 from leasable batteries on the basis of a questionnaire result that is a vehicle usage state and presents the battery 501.

In addition, the user visits the dealer shop, for example, every two years after purchase of the vehicle 50 in the present embodiment. In addition, when the vehicle 50 is connected to the power supply apparatus 60, the management apparatus 20 acquires battery usage state information that is a vehicle usage state. Further, when a reply to the questionnaire is received again at this point in time, the management apparatus 20 also acquires a questionnaire result. Then, the management apparatus 20 selects a battery 501 most suitable for user requirements at that point in time from leasable batteries on the basis of at least one of the questionnaire result and leased battery information and presents the battery 501.

Meanwhile, although an example in which the management apparatus 20 transmits a selection result to the power supply apparatus 60 has been described in the above-described example, the present invention is not limited thereto. The management apparatus 20 may transmit a selection result to a terminal (not shown) such as a smartphone or a tablet terminal of the user. Then, the terminal may display and present the selection result.

In addition, a timing at which the battery 501 is suggested may be at least one of a time of purchase of the vehicle 50, every predetermined interval after purchase of the vehicle 50, or at a time at which vehicle usage state information changes.

Further, a plurality of selection results with respect to leasable batteries to be presented may be provided. In this case, the processing unit 202 of the management apparatus 20 may select a top three and present the selected three, for example. These top three plans are, for example, a plan with high lease charges while having a little margin for wishes, a plan with no margin for wishes, and a plan with low lease charges while having a performance slightly lower than that desired. By presenting batteries 501 of a plurality of plans in this manner, the number of options of the user is increased. In addition, when a plurality of batteries 501 are mounted in the vehicle 50, the processing unit 202 may select and present a plurality of batteries 501 of the same condition.

Meanwhile, although an example of leasing a battery 501 has been described in the above-described example, the present invention is not limited thereto. For example, a battery 501 may be purchased instead of being leased or purchased using a monthly installation plan or the like. In even such a case, it is also possible to exchange to a battery 501 most suitable at that point in time by checking a usage state every two years, for example. Further, when a battery 501 is selected, the user may be allowed to select a monthly charge equal to the current one, a monthly charge lower than the current one, a monthly charge higher than the current one, or the like. Then, the management apparatus 20 may select a battery 501 that satisfies this condition.

Further, although an example of conducting a questionnaire for the user to acquire a usage state of the vehicle 50 has been described in the above-described example, the present invention is not limited thereto. After purchase of the vehicle 50, for example, the sensor 504 of the vehicle 50 may detect the rotational speed of the motor 503, and the like. Then, the vehicle controller 502 may obtain a mileage on the basis of the number of rotations and an instruction value and count a V2G operating time and the like. The power supply apparatus 60 may acquire such user-originating information about a vehicle usage state instead of a questionnaire result and transmit the information to the management apparatus 20.

While forms for carrying out the present invention have been described using the embodiments, the present invention is not limited to these embodiments at all, and various modifications and substitutions can be made without departing from the gist of the present invention.

What is claimed is:

1. A management apparatus comprising:
   an acquirer configured to acquire vehicle usage state information about a usage state of a vehicle; and
   a processing unit that is configured to apply the vehicle usage state information to a model which outputs feature amounts when vehicle usage information is input thereto to acquire the feature amounts, configured to select a secondary battery recommended to be mounted in the vehicle for which the vehicle usage state information is acquired from secondary batteries providable as the secondary battery to be mounted in the vehicle and storing electric power for travel on the basis of the acquired feature amounts, and configured to transmit a selection result of present the secondary battery to a power supply apparatus or to a display of a terminal that presents the selection result to a user, wherein the vehicle usage state information comprises user-originating information which is acquired from the user and represents a usage state of the vehicle assumed or experienced by the user, wherein the user-originating information is a result of a questionnaire conducted for the user, and wherein the processing unit obtains the feature amounts by inputting the result of the questionnaire to the model, represents the obtained feature amounts on a radar chart, and selects the secondary battery on a basis of a shape of the radar chart.

2. The management apparatus according to claim 1, wherein the questionnaire comprises expected traveling times in a week, an address, and family make-up.

3. The management apparatus according to claim 1, wherein the vehicle usage state information comprises battery usage state information about a usage state of the secondary battery.

4. The management apparatus according to claim 1, wherein the processing unit selects the secondary battery from the providable secondary batteries and presents the selected secondary battery at at least one occasion of a time of purchase of the vehicle, every predetermined interval after purchase of the vehicle, and a time of change of the vehicle usage state information.

5. A management method performed by a management apparatus, the management method comprising:
acquiring vehicle usage state information about a usage state of a vehicle;
applying the vehicle usage state information to a model which outputs feature amounts when vehicle usage information is input thereto to acquire the feature amounts;
selecting a secondary battery recommended to be mounted in the vehicle for which the vehicle usage state information is acquired from secondary batteries providable as the secondary battery to be mounted in the vehicle and storing electric power for travel on the basis of the acquired feature amounts;
transmitting a selection result of the secondary battery to a power supply apparatus or to a display of a terminal that presents the selection result to a user, wherein the vehicle usage state information comprises user-originating information which is acquired from the user and represents a usage state of the vehicle assumed or experienced by the user, and wherein the user-originating information is a result of a questionnaire conducted for the user;

obtaining the feature amounts by inputting the result of the questionnaire to the model;
representing the obtained feature amounts on a radar chart; and
selecting the secondary battery on a basis of a shape of the radar chart.

6. A computer-readable non-transitory storage medium storing a program causing a computer of a management apparatus to:
acquire vehicle usage state information about a usage state of a vehicle;
apply the vehicle usage state information to a model which outputs feature amounts when vehicle usage information is input thereto to acquire the feature amounts;
select a secondary battery recommended to be mounted in the vehicle for which the vehicle usage state information is acquired from secondary batteries providable as the secondary battery to be mounted in the vehicle and storing electric power for travel on the basis of the acquired feature amounts;
transmit a selection result of the secondary battery to a power supply apparatus or to a display of a terminal that presents the selection result to a user, wherein the vehicle usage state information comprises user-originating information which is acquired from the user and represents a usage state of the vehicle assumed or experienced by the user, and wherein the user-originating information is a result of a questionnaire conducted for the user;

obtain the feature amounts by inputting the result of the questionnaire to the model;
represent the obtained feature amounts on a radar chart; and
select the secondary battery on a basis of a shape of the radar chart.

* * * * *